A. AICHELE.
CHANGE GEAR.
APPLICATION FILED OCT. 16, 1915.

1,188,528.

Patented June 27, 1916.

Inventor:
Albert Aichele,

UNITED STATES PATENT OFFICE.

ALBERT AICHELE, OF BADEN, SWITZERLAND.

CHANGE-GEAR.

1,188,528.

Specification of Letters Patent. Patented June 27, 1916.

Application filed October 16, 1915. Serial No. 56,301. REISSUED.

*To all whom it may concern:*

Be it known that I, ALBERT AICHELE, a citizen of Switzerland, residing at Baden, in Switzerland, have invented certain new and useful Improvements in and relating to Change-Gears, of which the following is a full, clear, concise, and exact description.

This invention relates to improvements in change gears, especially such as are applied for automobile cars, and is adapted for transferring power from the automobile motor to the car wheels in order to make the automobile car run with a certain number of different speeds.

My invention in brief consists in providing inclined teeth for the several wheels of a change gear, the direction of inclination being such that the axial thrust of one wheel is substantially compensated by that of another wheel. The invention is thus differentiated from arrangements in which helices are cut on the shaft for the purpose of taking up the thrust of the wheels.

Figure 1:
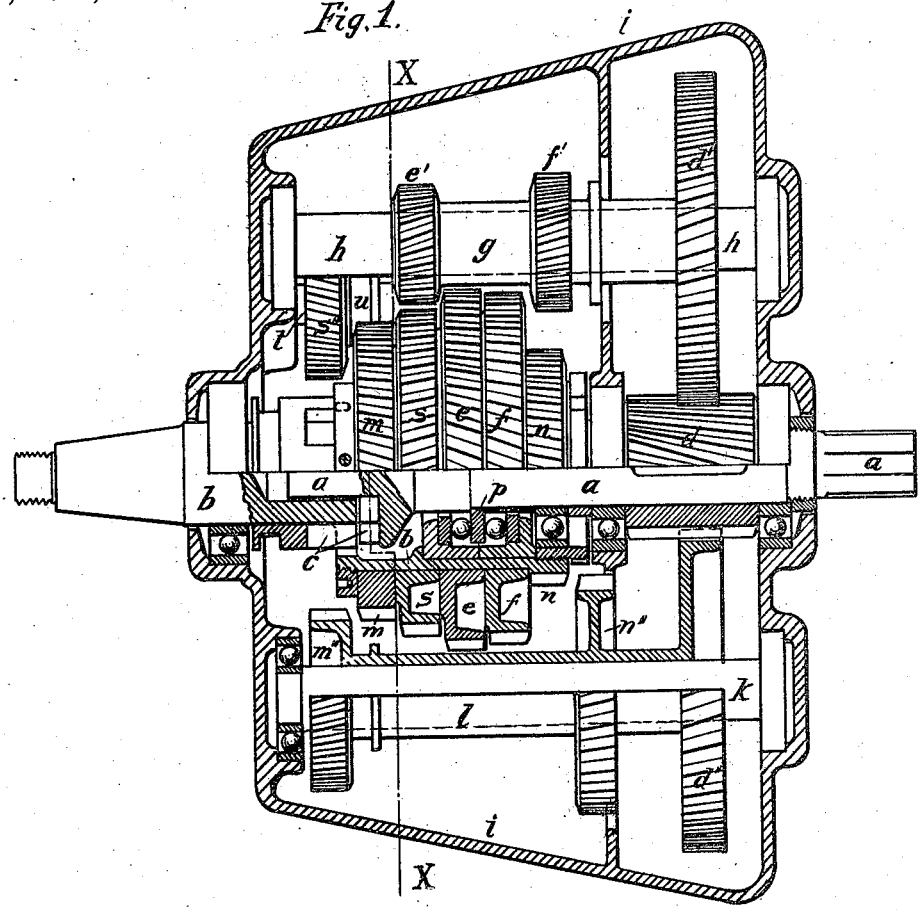
Figure 2:
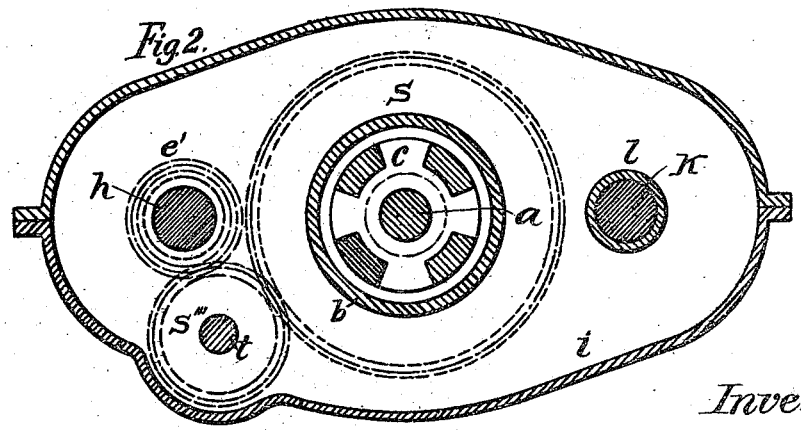

Referring to the accompanying drawings which show by way of example one possible construction of apparatus for carrying into effect the present invention, in which the change gear is to effect five speeds of the automobile car, Figure 1 is a part sectional plan change and Fig. 2 is a section along the line X—X of Fig. 1, in which may be seen the intermediate wheel $s'''$ the engaging of which causes the car to move backward.

The invention may be more fully explained by reference to these figures.

In Fig. 1 $a$ is the driving shaft which is fixed to the motor, and $b$ is the driven or working shaft which works on the car wheels. In order to obtain the highest speed these shafts can be direct coupled to one another by means of the clutch-coupling $c$. On the shaft $a$ is rigidly fixed the toothed wheel or pinion $d$ which is engaged continually with the wheel $d'$. The latter is rigidly connected to the change wheels $e'$ and $f'$ by the common sleeve $g$ and axially movable on the counter-axle $h$. The breadth of the wheel $d$ is equal to the breadth of the wheel $d'$ plus the amount of axial displacement of the wheel sleeve $g$. If the latter is displaced to the right, corresponding to the forward direction of the car, the change wheel $e'$ is thrown into gear with the wheel $e$ of the working shaft $b$, and the car runs with the first (*i. e.*, lowest) speed. If the sleeve $g$ is displaced to the left, corresponding to the backward direction of the car, the change wheel $f'$ is thrown into gear with the wheel $f$ of the working shaft $b$, and the car runs with the second speed. In order to save room in the axial direction, the working shaft $b$ is partially formed as a hollow shaft within the toothed wheels $e, f, m, n, s$, so that the bearings and the driving half of the coupling $c$ can be located within same. By means of the said pairs of wheels $d\ d'$, $e\ e'$ and $f\ f'$ and the coupling $c$ three steps of speed can be obtained. There are various ways of obtaining a greater number of steps in the speed. The way which I consider the best from the constructive point of view is shown in the figure and consists in the addition of further counter-axles at the rate of one for each speed step, or at the most one for two further feed steps. The figure shows a gear with five speed steps and therefore two counter-axles.

Besides the counter-axle $h$ already mentioned a further counter-axle $k$ is located in the housing $i$, which carries on the common sleeve $l$ the change wheels $m''$ and $n''$ as well as the toothed wheel $d''$ which latter is continually in gear with the large wheel $d$ of the driving shaft $a$ even when the latter is axially displaced. By moving the sleeve $l$ on the axle $k$ forward and backward, that is to the right or to the left respectively, either the two wheels $m\ m''$ or the wheels $n\ n''$ are thrown into gear making the car run with the third or fourth speed respectively.

Besides the toothed wheels $d, e, f, m$ and $n$ mentioned, a further toothed wheel $s$ is arranged rigidly fixed on the working shaft $b$, which cannot be thrown into gear with any of the said change wheels, and which serves to make the car run backward. This is effected, as shown in Fig. 2, by a further reversing wheel $s'''$ which is mounted on the axle $t$ located below $a$ and $h$ and is movable in the axial direction by means of the sleeve $u$. To this end the reversing wheel $s'''$ can be simultaneously thrown into gear with the wheels $s$ and $e'$.

Nothing has been mentioned yet with regard to the inclination of the teeth which effects the noiseless running of the gear. The manner in which the teeth of the wheels are inclined is of course of importance, and it is precisely the object of my invention to effect this in such a way that no axial pressure is exerted on the movable wheel sleeves $g$, $l$ and $u$ and that the wheels are not thrust out of gear. On the choice of the angle of inclination of the teeth of one wheel depends the angle of inclination of the teeth of all the other wheels. In the first place it is clear that the angle of inclination of the teeth of two wheels which are to gear with one another must be of the same magnitude but opposite in direction. For example, the inclination of the teeth of the wheel $d$ must be exactly of the same magnitude and in the opposite direction to that of the wheels $d'$ and $d''$, and the inclination of $e$ must be exactly similar and of the opposite direction to that of $e'$, etc.

If the motor shaft rotates clockwise, as seen from the motor, the axial component of the tooth pressure of the wheel $d$ (as shown in Fig. 1 of the drawing) is directed to the left and is taken up by the thrust bearing $p$. The tooth pressure reaction which is exerted by the wheel $d'$ has an axial component which is directed to the right. If one of the wheels $e'$ or $f'$ has been thrown into gear with $e$ or $f$ respectively, the axial component of the tooth pressure at the wheels $e'$ $f'$ must, according to the present invention, be of equal magnitude and acting in the opposite direction to that of wheel $d'$. The axial component is again in the opposing direction when the direction of inclination of the teeth of wheels $e'$ $f'$ is the same as that of the teeth of wheel $d'$ that is to say when the direction of inclination of a tooth of wheel $d'$ from left hand to right hand is in the upward direction, then the direction of inclination of the corresponding tooth face in wheels $e'$ or $f'$ must be in the upward direction considered from left to right hand. The magnitude of the axial component $A$ of the tooth pressure $P$ depends on the angle of inclination of the teeth; it is equal to the product of the tooth pressure $P$ (measured in the circumferential direction of the wheel) and the tangent of the inclination angle $v$ of the teeth (relative to a plain through the center of the shaft):

$$A = P . \tan . v.$$

The torque $D$ transmitted by the wheels is constant $$D = P . R,$$

where $R$ is the pitch-circle radius of a toothed wheel, consequently in wheels of different sizes $$D = P_1 . R_1 P_2 . R_2, \text{ etc.}$$

The circumferential forces $P$ are inversely proportional to the radii $R$ $$P_2 : P_1 = R_1 : R_2.$$

In order to compensate the axial components of two wheels on the same sleeve $g$ (for example $d'$ and $e'$), they must be equal to one another:

$$A_1 = A_2$$

This is the case when $$P_1 . \tan . v_1 = P_2 . \tan . v_2$$

or, as expressed as proportion:

$$\tan . v_1 : v_2 = P_2 : P_1$$
$$= R_1 : R_2.$$

In order to obtain equal axial components of the tooth pressure in wheels of different radii or diameters, it is necessary to make the inclination angles of such a magnitude that their trigonometric tangents are proportional to their diameters. This forms likewise part of my invention. As shown on the drawing, the teeth of the change wheel which has the largest diameter have the largest angle of inclination relatively to the axles.

The inclination of the teeth on the wheels of the working shaft $b$ must, of course, correspond again with that of the respective change wheels, viz. the inclination of $e'$ with $e$, of $f'$ with $f$, of $m''$ with $m$, of $n''$ with $n$. The axial pressure on $b$ toward the right hand is again taken up by the thrust bearing $p$.

The inclination of the teeth of the reversing wheel $s'''$ must be equal in magnitude and opposite in direction to that of the wheel $e'$ of the axle $g$. As the wheel $s'''$ comes into gear simultaneously with the wheel $s$ of the working shaft, the inclination of the teeth of the wheel $s$ must again be of equal magnitude and of opposite direction to that of the wheel $s'''$. The direction of teeth of the wheel $s$ must consequently correspond with that of the wheel $e'$.

The bearings, the arrangement of the shafts in the housing $i$, the coupling and the wheel sleeve displacing devices do not form part of my invention. I have not described them more precisely, considering that they are known to anyone skilled in the art. My invention, however, may be embodied in many other forms than that shown and described, and I, therefore, do not wish to restrict myself to the precise arrangement disclosed, but aim to cover all modifications within the scope of the appended claims.

What I claim as new and desire to secure by Letters Patent of the United States, is—

1. A change gear comprising a driving shaft, a driven shaft and a counter shaft, a toothed wheel on the driving shaft, a sleeve with at least two toothed wheels movable together on the counter shaft, a toothed wheel on the driven shaft, all toothed wheels having the teeth in such a manner inclined against their axes, that the sense of inclination of the teeth is the same for all wheels having the same geometrical axis and in reverse directions for the drive to and from the counter shaft so that the axial thrust of one wheel is substantially compensated by that of another wheel, together with a direct movable coupling between the driving and driven shafts.

2. A change gear comprising a driving shaft, a driven shaft and a counter shaft, a toothed wheel on the driving shaft, a sleeve movable on the counter shaft, three toothed wheels fixed on the sleeve, one of the latter wheels being constantly engaged with the wheel on the driving shaft, each of the two other wheels being adapted for being thrown into gear with a corresponding wheel on the driven shaft by moving the sleeve on the counter shaft, all wheels having the teeth in such a manner inclined against their axes that the sense of inclination of the teeth is the same for all wheels having the same geometrical axis and in reverse directions for the drive to and from the counter shaft so that the axial thrust of one wheel is substantially compensated by that of another wheel.

3. A change gear comprising a driving shaft, a driven shaft and a counter shaft, a toothed wheel on the driving shaft, a sleeve movable on the counter shaft, a number of toothed wheels fixed on the sleeve, one of the latter wheels being constantly engaged with the wheel on the driving shaft, the latter wheel having a breadth equal the sum of the breadth of the wheel engaged with itself and the sliding way of the above mentioned sleeve; a corresponding number of toothed wheels on the driven shaft, all wheels having the teeth in such a manner inclined against their axes, that the sense of inclination of the teeth is the same for all wheels having the same geometrical axis and in reverse directions for the drive to and from the counter shaft so that the axial thrust of one wheel is substantially compensated by that of another wheel.

4. A change gear comprising a driving shaft, a driven shaft and a counter shaft, a toothed wheel on the driving shaft, a number of toothed wheels axially movable together on the counter shaft, a number of toothed wheels on the driven shaft, all wheels having the teeth in such a manner inclined against their axes, that the sense of inclination of the teeth is the same for all wheels having the same geometrical axis and in reverse directions for the drive to and from the counter shaft so that the axial thrust of one wheel is substantially compensated by that of another wheel.

5. A change gear comprising a driving shaft, a driven shaft and a counter shaft, a toothed wheel on the driving shaft, a number of toothed wheels axially movable together on a counter shaft, a number of toothed wheels on the driven shaft, all wheels having the teeth in such a manner inclined against their axes, that the sense of inclination of the teeth is the same for all wheels having the same geometrical axis and in reverse directions for the drive to and from the counter shaft so that the axial thrust of one wheel is substantially compensated by that of another wheel, the angles of inclination of teeth of the wheels movable on counter shafts which angles are formed between the teeth and the direction of the axis of the wheels, being such that their trigonometrical tangents are proportional to their respective pitch-circle diameters.

6. A change gear comprising a driving shaft, a driven shaft and a counter shaft, a toothed wheel on the driving shaft, a number of toothed wheels axially movable together on a counter shaft, a number of toothed wheels on the driven shaft, all wheels having the teeth in such a manner inclined against their axes, that the sense of inclination of the teeth is the same for all wheels having the same geometrical axis and in reverse directions for the drive to and from the counter shaft so that the axial thrust of one wheel is substantially compensated by that of another wheel, a further toothed wheel on the driven shaft, the sense of inclination of teeth of which is inverse to the sense of inclination of teeth of the other wheels on the driven shaft, a reversing wheel axially movable on a further shaft, this wheel being adapted to engage with both the above mentioned wheel on the driven shaft and one of the wheels on the counter shaft in the same time.

7. In combination a driving shaft, a toothed wheel with inclined teeth thereon, a driven shaft, five toothed wheels with inclined teeth thereon, a movable clutch coupling between the driving and driven shafts, two counter shafts, an axially movable sleeve on each counter shaft, three toothed wheels with inclined teeth fastened on each sleeve, a further shaft with one axially movable toothed wheel with inclined teeth thereon, the inclination of the teeth of the various wheels being such that the axial thrust of one wheel is substantially compensated by that of another wheel, a box surrounding the whole gear containing the bearings for all shafts.

8. In combination a driving shaft, a toothed wheel thereon, a driven shaft, a number of toothed wheels on an enlarged hollow part of the driven shaft, a movable clutch-coupling and a step-bearing in the inner room of the hollow part of the driven shaft, a number of counter shafts, an axially movable sleeve on each counter shaft, toothed wheels on the movable sleeves, a further shaft with a movable reversing wheel thereon, a box surrounding the whole gear containing the bearings for all shafts, all toothed wheels having the teeth in such a manner inclined against their axes, that the sense of inclination of the teeth is the same for all wheels having the same geometrical axis and in reverse directions for the drive to and from the counter shaft so that the axial thrust of one wheel is substantially compensated by that of another wheel.

9. A change gear including a driving shaft, a driven shaft and a counter shaft, a toothed wheel on the driving shaft, rigidly connected wheels movable on the counter shaft, a toothed wheel on the driven shaft, all toothed wheels having the teeth in such a manner inclined against their axes, that the sense of inclination of the teeth is the same for all wheels having the same geometrical axis and in reverse directions for the drive to and from the counter shaft so that the axial thrust of one wheel is substantially compensated by that of another wheel.

10. A change gear comprising a driving shaft, a driven shaft and a plurality of counter shafts, a toothed wheel on the driving shaft, a plurality of sleeves each with at least two toothed wheels movable together on the counter shafts, a number of toothed wheels on the driven shaft, all toothed wheels having the teeth in such a manner inclined against their axes, that the sense of inclination of the teeth is the same for all wheels having the same geometrical axis and in reverse directions for the drive to and from the counter shaft so that the axial thrust of one wheel is substantially compensated by that of another wheel, together with a direct movable coupling between the driving and driven shafts.

In testimony whereof, I affix my signature.

ALBERT AICHELE.

Witnesses:
CARL CUBLER,
BERTHA C. GROB.

Copies of this patent may be obtained for five cents each, by addressing the "Commissioner of Patents, Washington, D. C."